US00RE50131E

(19) United States
(12) Reissued Patent
Carolan

(10) Patent Number: US RE50,131 E
(45) Date of Reissued Patent: Sep. 17, 2024

(54) THREE DIMENSIONAL BILLBOARD DISPLAY USING FOAM INSERTS AND FLEXIBLE COVER

(71) Applicant: Edward Francis Carolan, Mono (CA)

(72) Inventor: Edward Francis Carolan, Mono (CA)

(21) Appl. No.: 17/870,031

(22) Filed: Jul. 21, 2022

Related U.S. Patent Documents

Reissue of:
(64) Patent No.: 10,741,108
Issued: Aug. 11, 2020
Appl. No.: 15/804,620
Filed: Nov. 6, 2017

U.S. Applications:
(60) Provisional application No. 62/462,104, filed on Feb. 22, 2017.

(51) Int. Cl.
*G09F 15/00* (2006.01)
*G09F 7/14* (2006.01)
*G09F 7/18* (2006.01)

(52) U.S. Cl.
CPC ..... *G09F 15/005* (2013.01); *G09F 7/14* (2013.01); *G09F 7/18* (2013.01); *G09F 15/0025* (2013.01); *G09F 2007/1856* (2013.01); *G09F 2015/0093* (2013.01)

(58) Field of Classification Search
CPC ..... G09F 15/0025; G09F 1/08; G09F 2003/0225; G09F 2007/1856
See application file for complete search history.

(56) References Cited

U.S. PATENT DOCUMENTS 2,630,574 A * 3/1953 Malarkey ..... A41D 25/00 2/144
3,758,358 A * 9/1973 Kurodo ..... B29C 65/02 156/222
4,271,620 A 6/1981 Vicino
4,372,071 A * 2/1983 Vicino ..... G09F 15/0025 40/624
4,585,684 A * 4/1986 Mackarous ..... A44C 3/001 156/213
4,800,947 A * 1/1989 Loomis ..... G09F 15/0025 160/368.1

(Continued)

*Primary Examiner* — Sarah B McPartlin

(74) *Attorney, Agent, or Firm* — Kyle R Satterthwaite; Ryan W Dupuis; Ade & Company Inc.

(57) ABSTRACT

A three-dimensional billboard display system features a flexible sheet of banner material having displayed content on a display side thereof, and a two-dimensional footprint area on the display side that is discretely identifiable from the displayed content. A flexible cover fastened to the flexible sheet in a position overlying the two-dimensional footprint area on the display side and enclosing a three-dimensional space between said cover and said flexible sheet. One or more inserts form a three-dimensional body of predetermined shape inside the three-dimensional space, the flexible cover spanning in taut condition over the three-dimensional body, thereby imparting the predetermined shape to the three-dimensional space and imparting the flexible cover with a three-dimensional form bulging outwardly from the display side of the flexible sheet. A reinforcement layer features a mesh or netting of criss-crossing webbing straps on a backside of the flexible sheet to carry the weight of the 3D embellishment.

25 Claims, 6 Drawing Sheets

(56) References Cited

U.S. PATENT DOCUMENTS

| | | | | | |
|---|---|---|---|---|---|
| 5,001,853 | A * | 3/1991 | Odien | G09F 3/04 | 206/475 |
| 5,184,362 | A * | 2/1993 | Yager | A47G 9/0253 | 446/72 |
| 5,373,655 | A | 12/1994 | Suzuki | | |
| 5,392,544 | A * | 2/1995 | Price | G09F 1/10 | 40/616 |
| D385,740 | S * | 11/1997 | Palmer | D6/595 | |
| 5,813,546 | A * | 9/1998 | Wilson | A47F 7/06 | 206/461 |
| 6,023,872 | A * | 2/2000 | Falkenstein, Sr. | G09F 17/00 | 40/538 |
| 6,152,298 | A * | 11/2000 | Dods | B65D 75/36 | 206/335 |
| 6,216,374 | B1 | 4/2001 | Lawrence | | |
| 7,614,498 | B2 * | 11/2009 | O'Keefe | B65D 75/366 | 206/459.5 |
| 9,483,966 | B2 * | 11/2016 | Carolan | G09F 15/00 | |
| 2002/0108286 | A1 * | 8/2002 | Brockley | A47G 1/0616 | 40/800 |
| 2009/0183408 | A1 | 7/2009 | Dicke | | |
| 2010/0199535 | A1 | 8/2010 | Reynolds | | |
| 2011/0225860 | A1 | 9/2011 | Troiano et al. | | |
| 2016/0232823 | A1 * | 8/2016 | Carolan | G09F 15/00 | |

* cited by examiner

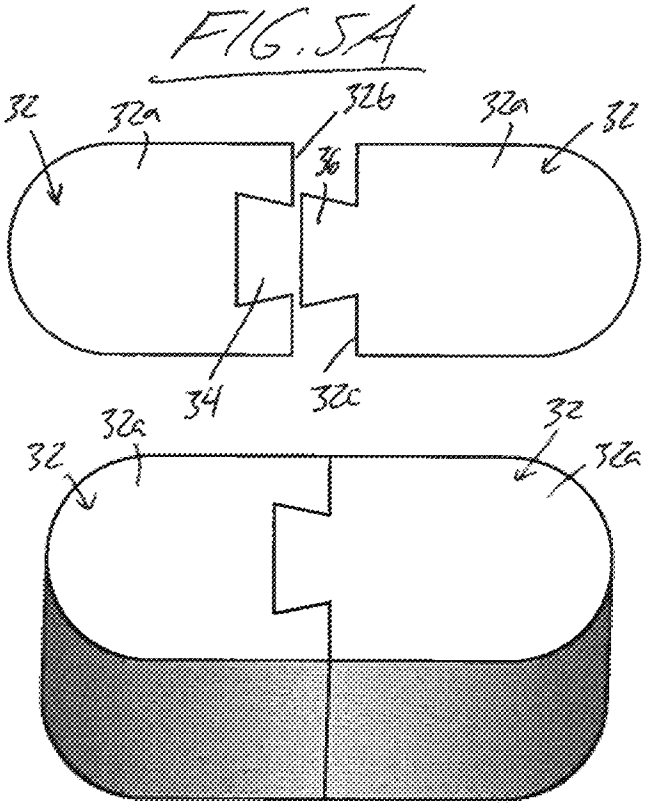
FIG. 5A
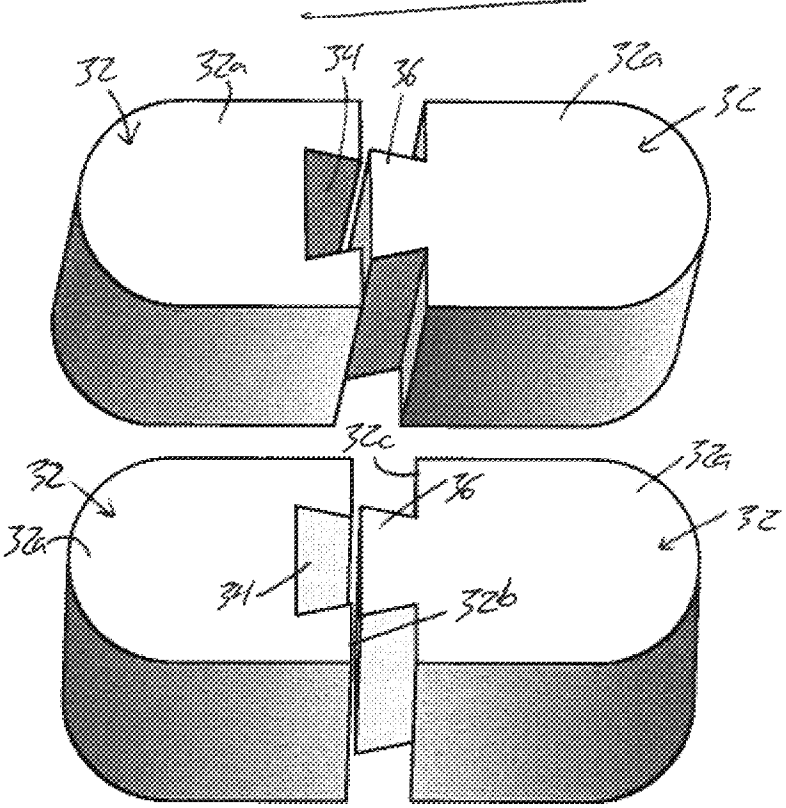
FIG. 5B
FIG. 5C
FIG. 5D

THREE DIMENSIONAL BILLBOARD DISPLAY USING FOAM INSERTS AND FLEXIBLE COVER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application *is a reissue of U.S. Pat. No. 10,741,108, which* claims benefit under 35 U.S.C. 119(e) of U.S. Provisional Application No. 62/462,104, filed Feb. 22, 2017, the entirety of which is incorporated herein by reference.

FIELD OF THE INVENTION

The present invention relates generally to billboards used for advertisement, promotional or informational purposes, and more particularly to billboards with three-dimensional display components.

BACKGROUND

It has been known in the prior art to add three-dimensional display components to conventional two-dimensional billboards by attaching a foam constructed or inflatable embellishment to the display side of a billboard, whereupon embellishment bulges outward from the remainder of the billboard's flat face to provide a three-dimensional effect. Previously, such installation involved installing a vinyl banner over the facing of a billboard support structure in a conventional manner, then lifting a separate three-dimensional embellishment up to the billboard and assembling suitable auxiliary structure to carry the embellishment on the plywood facing of the billboard frame. In the instance of a foam embellishment, the construction process involved custom-shaping and internally reinforcing a single-piece foam unit of substantial size, and spray-coating the finished foam to protect it from the elements once installed and provide it with the desired colour and appearance to achieve the intended aesthetic effect.

Applicant's prior U.S. Pat. No. 9,483,966, the entirety of which is incorporated herein by reference, disclosed a unique solution for inflatable 3D billboard embellishments, where the vinyl banner is equipped with strips of reinforcement webbing behind a two dimensional area of the flexible banner at which the inflatable embellishment is to be attached, and additional reinforcement webbing on the rear of an inflatable envelope is sewn through the banner into the reinforcement webbing on the backside thereof. Through such reinforcement, the banner itself, when stretched taut over the billboard frame, has sufficient structural integrity to support the inflatable embellishment, thus avoiding the need to directly mount the embellishment to the billboard support structure. The vinyl banner and flexible webbing can be folded flat for efficient transport, as can the flexible envelope of the inflatable embellishment, and no auxiliary structural support components are required.

The present application discloses a further alternative option for three-dimensional billboard displays that similarly enables support of the 3D embellishment purely on the vinyl banner without auxiliary support, but also avoids the need for air inflation equipment or internally reinforced and/or coated foam.

SUMMARY OF THE INVENTION

According to a first aspect of the invention, there is provided a three-dimensional billboard display system comprising:

a flexible sheet of banner material having displayed advertisement, promotional or informational content on a display side of said flexible sheet;

a two-dimensional footprint area on the display side of said flexible sheet that is discretely identifiable from the displayed content;

a flexible cover selectively fastenable to the flexible sheet in a position overlying the two-dimensional footprint area on the display side of said flexible sheet to enclose a three-dimensional space between said cover and said flexible sheet; and one or more inserts forming, or positionable with one another to form, a three-dimensional body of predetermined shape that is placeable at the display side of the flexible sheet in an installed position overlying the two-dimensional footprint area to accept taut placement of the flexible over the three-dimensional body to impart the three-dimensional shape to said three-dimensional space and thereby provide the flexible cover with a three-dimensional form bulging outwardly from the display side of the flexible sheet to create a three-dimensional embellishment on said flexible sheet of banner material.

According to a second aspect of the invention, there is provided a three-dimensional billboard display system comprising:

a flexible sheet of banner material having displayed advertisement, promotional or informational content on a display side of said flexible sheet;

a two-dimensional footprint area on the display side of said flexible sheet that is discretely identifiable from the displayed content;

a flexible cover fastened to the flexible sheet in a position overlying the two-dimensional footprint area on the display side of said flexible sheet and enclosing a three-dimensional space between said cover and said flexible sheet; and one or more inserts forming a three-dimensional body of predetermined shape inside the three-dimensional space, the flexible cover spanning in taut condition over the three-dimensional body, thereby imparting the predetermined shape to the three-dimensional space and imparting the flexible cover with a three-dimensional form bulging outwardly from the display side of the flexible sheet.

Preferably said one or more inserts comprise foam.

Preferably said one or more inserts comprise a first set of fastening elements thereon by which said one or more inserts are fastenable to the flexible sheet.

Preferably said flexible banner comprises a second set of fastening elements thereon for cooperative engagement with the first of fastening elements to secure the one or more inserts to the flexible sheet.

Preferably the first and second sets of fastening elements comprises hook and loop fastening elements.

Preferably said hook and loop fastening elements comprise flexible belts with mounting portions attached to a first one of either said flexible sheet or said one or more inserts and free portions movable relative to said mounting portions, and mating pieces attached to a second of either said flexible sheet or said one or more inserts for receiving said free portions of the flexible belts to hold said one or more inserts to the flexible sheet.

Preferably the flexible belts are attached to the flexible sheet, and the mating pieces are attached to said one or more inserts.

Preferably said mating pieces comprise elongated strips.

Preferably the flexible belts span across the two-dimensional footprint area, with the mounting portions residing within said mounting area and the free portions reaching beyond said footprint area at opposing sides thereof.

Preferably the mating pieces circumscribe multiple sides of the one or more inserts for mating of the flexible belts with said mating pieces in a manner wrapped around said multiple sides of the one or more inserts.

Preferably the flexible belts are fastened through the flexible sheet to reinforcement members on a backside of the flexible sheet.

Preferably said reinforcement members are flexible members foldable together with the flexible banner.

Preferably said reinforcement members comprise webbing.

Preferably said reinforcement members are arranged in a criss-crossing grid to define a mesh or netting.

Preferably the flexible sheet and the flexible cover comprise mating zipper teeth co-operable with one another to achieved zippered fastening of the flexible cover to the flexible sheet along a perimeter of the two-dimensional footprint area.

Preferably the one or more inserts comprise a plurality of inserts selectively connectable to one another to form the three-dimensional body, and separable to one another for transport and storage.

Preferably the plurality of inserts comprise paired inserts having matable male and female features thereon.

Preferably the mating male and female features define respective halves of a dovetail joint.

According to a third aspect of the invention, there is provided a method of creating a three-dimensional billboard display, the method comprising placing one or more inserts over a two-dimensional footprint area at a display side of a flexible banner such that the one or more inserts project forwardly from the display side of the banner with a predetermined three-dimensional shape, and securing a flexible cover to the flexible banner along a perimeter of the two-dimensional footprint area thereof in a position spanning over the one or inserts in a taut condition imparting said three-dimensional shape to said flexible cover.

Preferably the step of placing said one or more inserts comprises securing the one or more inserts to the flexible banner.

Preferably the method includes strapping said one or more inserts to the flexible banner.

Preferably the method includes strapping said one or more inserts to the flexible banner using flexible belts that are fastened to said flexible banner within the two-dimensional footprint area thereof.

Preferably the method includes strapping said one or more inserts to the flexible banner using flexible belts fastened through said flexible banner to reinforcement members attached to a backside thereof.

Preferably the method includes securing the one or more inserts to the flexible banner with hook and loop fastener material.

Preferably the method includes the one or more inserts comprise a plurality of inserts, and the method comprises assembling said plurality of inserts together to form the predetermined three-dimensional shape.

Preferably the step of assembling said plurality of inserts comprises joining said plurality of inserts together at mating male and female features thereof.

Preferably the step of joining said plurality of inserts together comprises joining together mating halves of a dovetail joint between said inserts.

According to a fourth aspect of the invention, there is provided a reinforced flexible banner for three-dimensional billboard displays, said flexible banner comprising a flexible sheet of banner material a front display side and an opposing rear side, a reinforcement layer attached to the rear side of the flexible sheet and comprising flexible reinforcement members foldable together with the flexible banner.

Preferably the flexible reinforcement members are arranged in criss-crossing fashion to form a mesh or netting.

Preferably said flexible reinforcement members have a greater tear strength than said flexible sheet of banner material.

Preferably said flexible reinforcement members comprise webbing.

Preferably the flexible reinforcement members include a set of flexible reinforcement members running along a height dimension of the banner so as to lie in upright orientations in an installed state of the billboard display, said set of flexible reinforcement members carrying installation loops at opposing top and bottom ends thereof to receive passage of mounting rods through said loops at top and bottom sides of reinforcement layer to enable tensioning of the flexible banner on a billboard support structure behind a display area thereof by use of ratchet straps connected to said mounting rods.

BRIEF DESCRIPTION OF THE DRAWINGS

One embodiment of the invention will now be described in conjunction with the accompanying drawings in which:

FIGS. 5A-5C are plan and perspective views of the foam inserts in an exploded condition prior to mated assembly thereof.

FIG. 5D is a perspective view of the foam inserts in an assembled state.

In the drawings like characters of reference indicate corresponding parts in the different figures.

DETAILED DESCRIPTION

Figure 1:
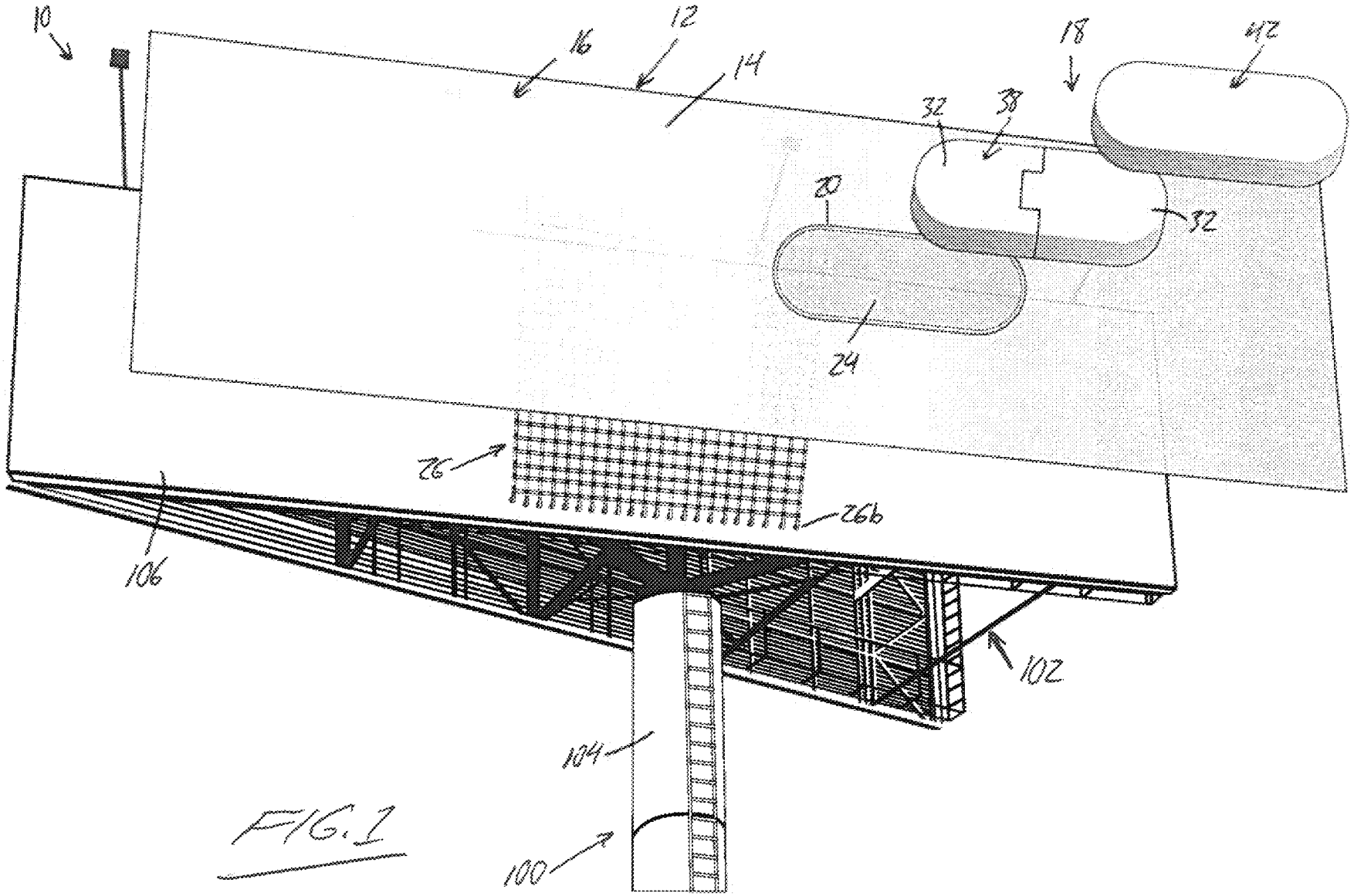
FIG. 1 is an exploded schematic view of a three-dimensional billboard of the present invention, in which foam block inserts are strapped to the front display side of a webbing-reinforced vinyl banner and then conformingly covered with a flexible cover zippered onto the banner to form a 3D embellishment thereon.
Figure 4:
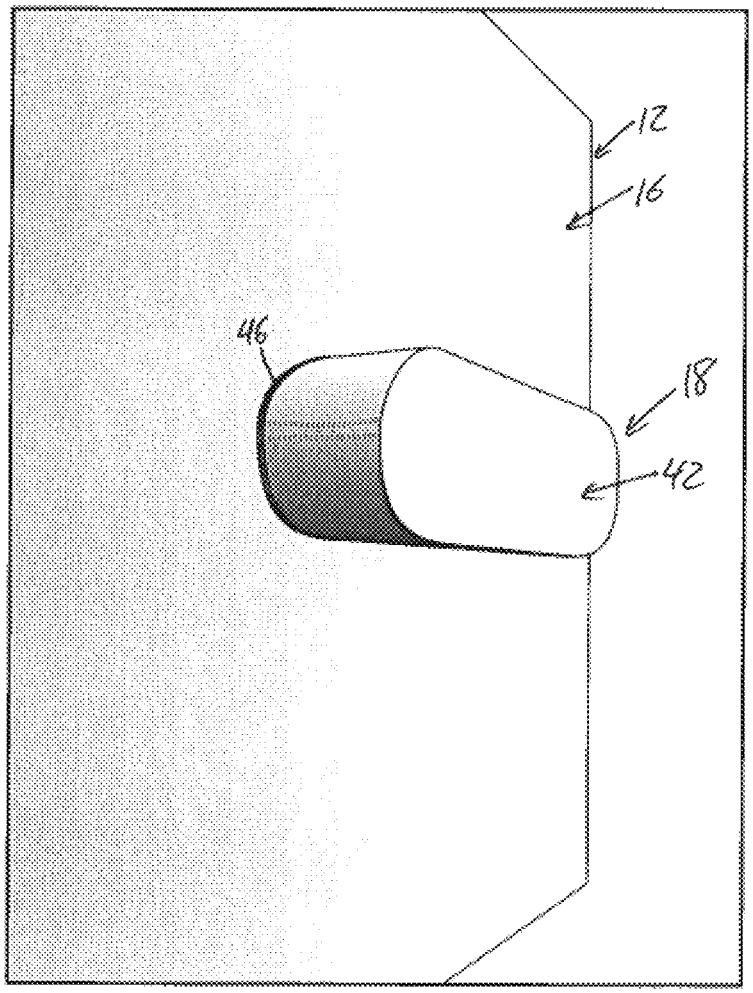
FIG. 4 is a side perspective view of the 3D embellishment in its fully installed condition protruding from the front display side of the banner.

FIG. 1 shows an exploded view of a three-dimensional (3D) billboard display 10 of the present invention, which features a banner 12 in the form of a flexible sheet of vinyl having advertisement, promotional or information content or indicia 14 printed on a front display side 16 thereof, as is commonplace in the billboard industry. The front display side 14 of the banner 12 refers to the side thereof that faces away from a billboard support structure 100 on which the banner will be installed, whereby the content 14 is visually exposed for viewing/reading thereof by passersby. Where the billboard display 10 differs from a conventional two-dimensional banner-only billboard display is in the addition of a three-dimensional embellishment assembly 18 to the banner 12, which when assembled and installed, bulges outward from the underlying banner 12 to contribute the 3D aspect of the overall display, as shown in FIG. 4. Disclosed herein is a solution by which the three-dimensional embellishment is provided as a multi-piece assembly using non-reinforced foam, and that can be transported in a space and cost efficient manner and easily installed on site in a convenient tool-free manner requiring no auxiliary support components beyond the standard existing billboard structure at the billboard site.

An outline 20 of a two-dimensional base footprint of the embellishment 18 is provided on the front display side 16 of the banner 12 at an area thereof that is unoccupied by the other advertisement, promotional or informational content 14. The footprint area 24 bound within the confines of the outline 20 denotes the portion of the banner 12 that will be concealed behind the embellishment 18 once installed on the banner 12. The footprint area 24, or at least the outline 20 thereof, may be printed or drawn on the front side 16 of the banner 12, for example being printed at the same time as the printed content 14 thereon. Alternatively, the footprint area 24 may be defined by a separate sheet of vinyl or other flexible material sewn or otherwise affixed to the front display side of the banner to form a discrete layer separate therefrom, in which case the outer perimeter of this separate sheet defines the outline 20 of the footprint area 24. In either case, but especially if printed, the footprint area 24, or at least the perimeter outline 20 thereof, preferably has a visually distinct color from surrounding areas of the banner's front display side 16 so that the footprint area is discretely identifiable from the other areas of the banner to serve as a visual guide for proper placement of the 3D embellishment during installation of the billboard. If the footprint area 24 is distinguished from the banner as a discretely separate layer, the additional color-based distinction of the area may not be necessary, but does provide for more readily apparent visual identification of the footprint area without requiring close, careful inspection of the banner.

With particular reference to FIG. 1, there is a reinforcement layer 26 featuring one or more webbing strips, or a mesh or netting. In one embodiment, this reinforcement layer 26 is formed of a pre-assembled two-dimensional grid of criss-crossing flexible webbing straps forming the mesh or netting. Although shown as separate from the flexible banner in FIG. 1 for illustrative purposes, the reinforcement mesh or netting 26 is pre-attached to the rear side of the flexible banner prior to on-site installation of the billboard, having been previously sewn to the flexible banner 12 during factory production thereof. The webbing mesh or netting 26 defines a reinforced area of the banner 12 that spans at least the entirety of the footprint area at which the embellishment will be attached. The strong woven structure of the flat webbing 26 has significantly greater tear strength than the vinyl sheet, thus imparting the banner 12 with the reinforcement to support the finished embellishment 18 in a cantilevered state jutting from the front face of the banner 12 when the banner is installed on a billboard support structure. This way, no bolting or other direct fastening of the embellishment to the billboard support structure is required to install the 3D billboard display 10 of the present invention. Common synthetic webbing fabrics such as nylon, polyester, polypropylene may be used, although other webbing materials, whether synthetic or natural, may be used, provided that the resulting reinforcement strips of the banner provide suitable support strength for carrying the embellishment on the banner. Furthermore, it will be appreciated that the criss-crossing strips of reinforcement material are not limited exclusively to webbing, as other material structures providing greater strength than the banner's primary vinyl sheet may alternatively be used, provided the reinforcement material is sufficiently flexible so as to be foldable with the vinyl sheet into compact form for space and cost efficient shipping of the billboard.

Figure 2:
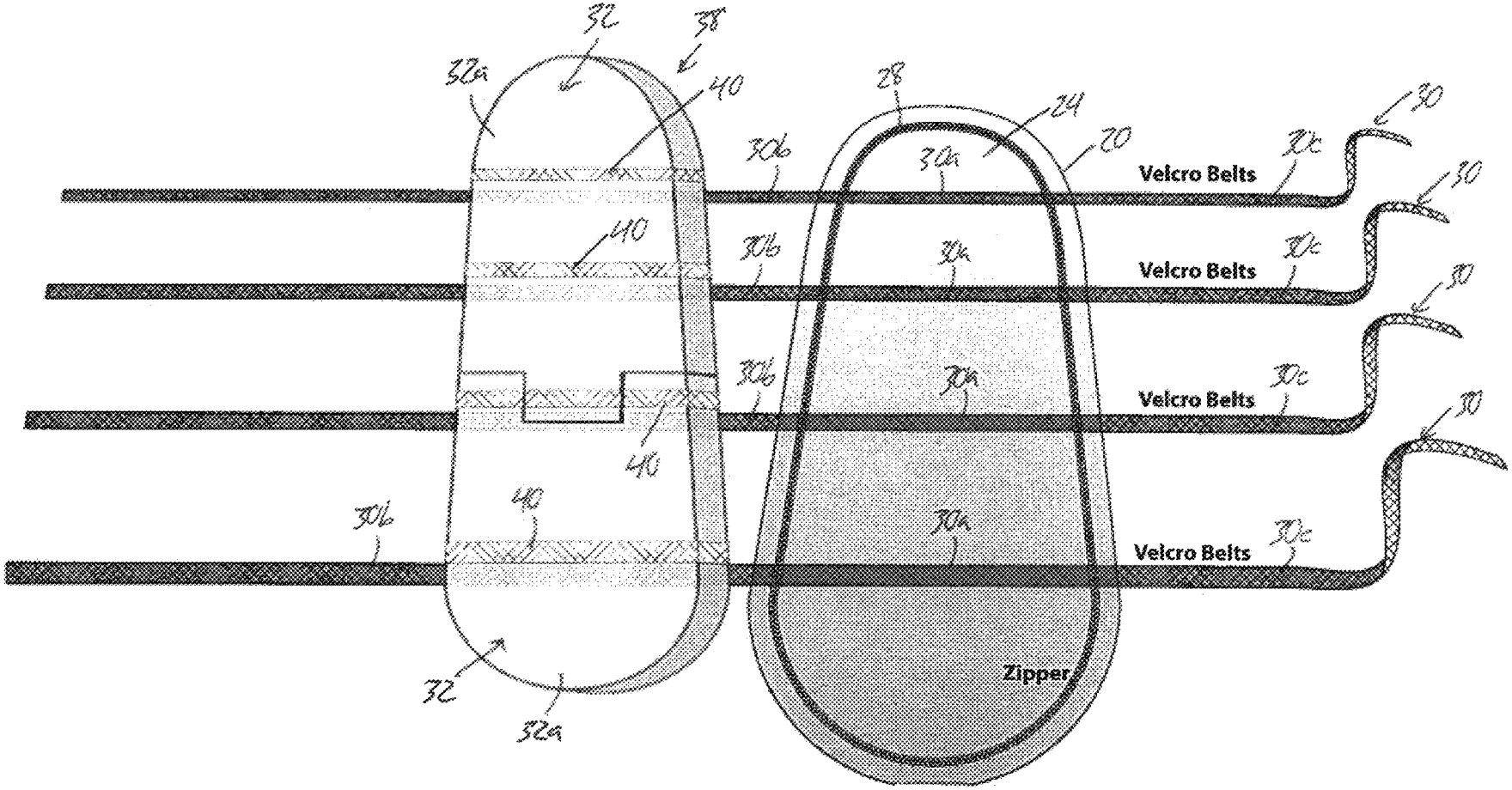
FIG. 2 schematically illustrates use of flexible belts on the vinyl banner to strap the assembled foam inserts into place.

Turning to FIG. 2, around the perimeter of the footprint area 24 at a short distance inside the outline 20, a set of zipper teeth 28 are laid along the perimeter of the footprint area 24, having been sewn to the flexible banner 12 during the factory production thereof subsequent to printing or attachment of the footprint outline or area 20, 24. During the same factory production of the flexible banner, a set of flexible webbing belts 30 are laid across the previously printed or attached footprint area 24. A central mounting portion 30a of each belt 30 residing within the footprint area 24 between opposing points on the zipper's perimeter-adjacent path is affixed to the flexible banner 12 by sewing of this central mounting portion 30a of the belt 30 through the flexible banner 12 to the mesh or netting reinforcement layer 26 at the rear side of the banner 12. At opposing ends of the mounting portion 30a of each belt are two free portions 30b, 30c that are not directly attached to the flexible banner, and thus are freely movable relative thereto. Each belt 30, on the front side thereof facing away from the banner 12, features hook or loop fabric thereon, at least at the free portions 28b, 28c, and preferably also at the mounting portion 28a.

A plurality of foam blocks 32 each have a front face 32a, an opposing rear face (unnumbered), and peripheral edges joining the front and rear faces together around the perimeter of the block 32. The rear face is flat, being intended for flush placement against the front side of the flexible banner 12 at the footprint area 24 thereof during installation of the foam blocks 32 at the billboard's installation site. The illustrated example features two foam blocks, each of which is also flat-faced at the front thereof and features front and rear faces of identical and aligned shape. The two foam blocks of this illustrated example are used to create a pill-shaped 3D body, for example for advertising a medicinal, vitamin, or supplement product, where assembly of the foam blocks 32 places their flat front faces 32a in coplanar relationship cooperatively forming a pill-like oblong shape. The equal thicknesses of the two blocks between their flat front and rear faces, as defined by the peripheral edges of the blocks, denote the protruding dimension by which the assembled blocks bulge forwardly from the flexible banner 12 when assembled thereon during installation of the billboard.

With reference to FIGS. 5A-5D, at mating peripheral edges of the blocks that fit together when the blocks are assembled, the two blocks 32 are configured with mating male and female profiles. Mating peripheral edge 32b of one block has a female feature 34 in the form of a recessed mortise or groove, while the mating peripheral edge 32c of the other block features a matingly sized and shaped male feature 36 in the form of a protruding tenon or tongue. Accordingly, mating of the male and female features 34, 36 together serves to automatically align the two foam blocks 32 relative to one another to collectively define a three-dimensional body 38 of predetermined three-dimensional shape, e.g. the pill-shaped body of the illustrated example. As shown in FIG. 5, the male and female features are preferably tapered at matching angles to cooperatively form a dovetail joint that is assembled by sliding the mating peripheral edges of the foam blocks together in the thickness or depth direction thereof. As a result, the finished joint not only maintains the assembled blocks in proper alignment with one another, but also prevents separation of the mating peripheral edges from one another to maintain the predetermined shape and size of the assembled 3D body, thus providing structural stability to same. This also prevents relative movement between the foam blocks that otherwise might occur in the completed state of the billboard, thereby preventing abrasion-induced wear of the blocks that otherwise might detriment the lifespan of the 3D embellishment.

Turning back to FIG. 2, each foam block 32 has a multiple fastening strips 40 thereon for mating with a respective set of the flexible belts 30 on the front side of the flexible to strap the block thereto during on-site installation of the billboard. Each fastening strip 40 spans at least the front face 32a of the block, and in the illustrated embodiment additionally spans two opposing peripheral edges of the block at exposed sides thereof not mated with any other of the foam blocks. Preferably, each strip 40 also spans the rear face of the block. Each fastening strip features hook or loop fabric at the outer side thereof that faces away from the underlying foam block 32, whereby the hook or loop fabric on the fastening strip 40 of the foam block is matable with the loop or hook fabric on the respective flexible belt 30 of the banner.

The peripheral shape of the three-dimensional body assembled from the foam blocks, at least at the flat rear face of the assembled three-dimensional body formed by the coplanar flat rear faces of the foam blocks, conforms with the outline of the footprint area 24 on the flexible banner. More specifically, the body's rear face is sized and shaped to closely match the zipper-bounded center area of the footprint area 24 on the banner 12 so that once the banner has been installed on the billboard support structure, the rear face of assembled three-dimensional body 38 can be conformingly placed within the zippered area to automatically align the three-dimensional body in the appropriate position and orientation on the banner. The flexible belts 30 and the fastening strips 40 are respectively positioned on the banner and the foam blocks so as to automatically align in respective pairs under such aligned placement of the assembled three-dimensional body on the banner.

Accordingly, to secure the three-dimensional body 38 to the installed banner, the blocks are fitted together at their matingly profiled peripheral edges 32b, 32c to assemble the three-dimensional body 38 in a puzzle-like manner. The flat rear face of the assembled three-dimensional body 38 (formed by the coplanar flat rear faces of the foam blocks) is then placed against the conformingly shaped zipper-bound central area of the banner's footprint area 24. At this point, the belts 30 are pulled snugly over the three-dimensional body 38 at the exposed peripheral edges and front faces 32a thereof, where the mating hook and loop fabric of the belts 30 and fastening strips 40 engage together, thereby securely strapping the three-dimensional foam body 38 to the banner 12. The inclusion of hook and loop fabric at the mounting portions 30a of the flexible belts and the rear faces of the foam blocks help initially hold the foam body 38 in place on the banner while the flexible belts are being wrapped over the foam body to further secure the installed position of same.

Strapped onto the banner, the foam body 38 is held in place solely by the belts 30 and hook and loop fasteners, which attach the foam body only to the reinforced banner, with no direct attachment of the foam body to the underlying billboard support structure. Accordingly, the blocks preferably have a pure foam construction free of any internal bars, rods or other reinforcements or rigid attachment components that would otherwise be required to fasten the body directly to the billboard support structure.

Figure 3:
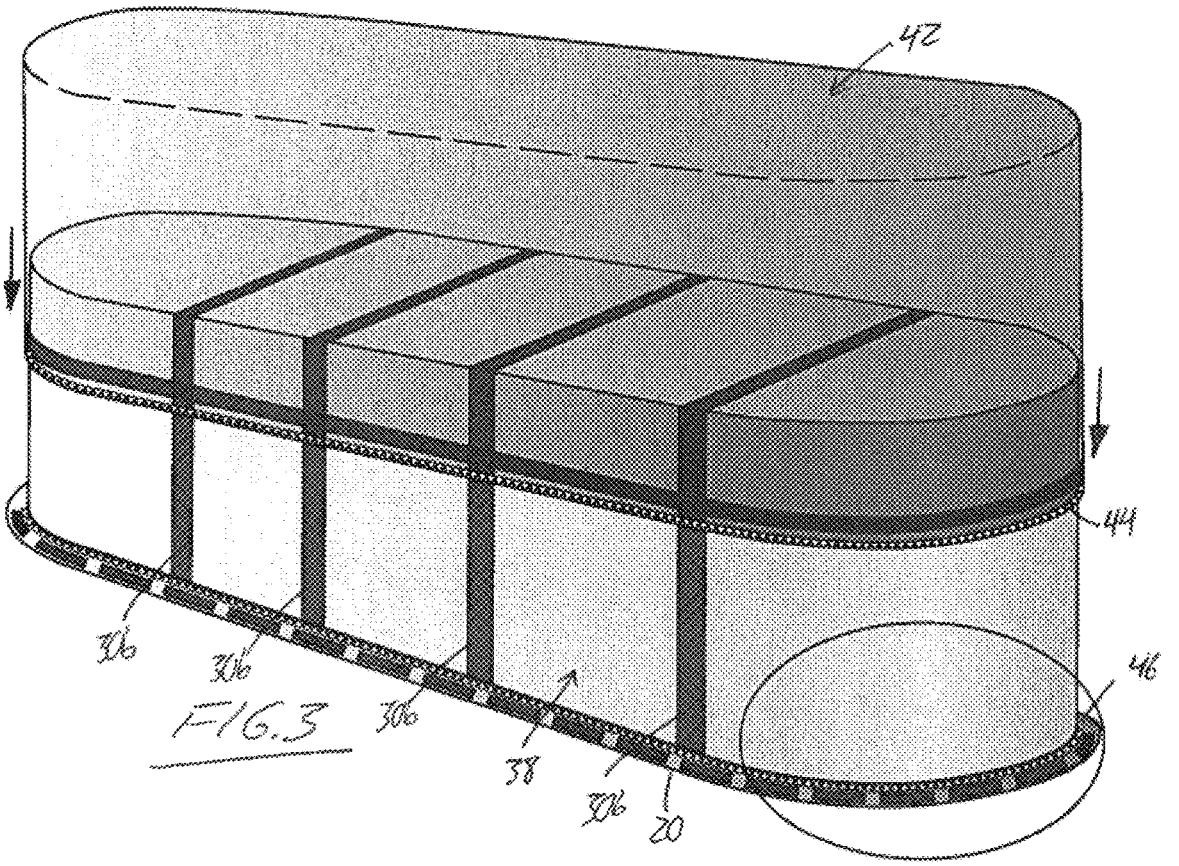
FIG. 3 shows a partially exploded schematic of the foam inserts installed in their strapped positions on the banner, and illustrating placement of the flexible cover over same into zippered connection with the banner.
Figure 3A:
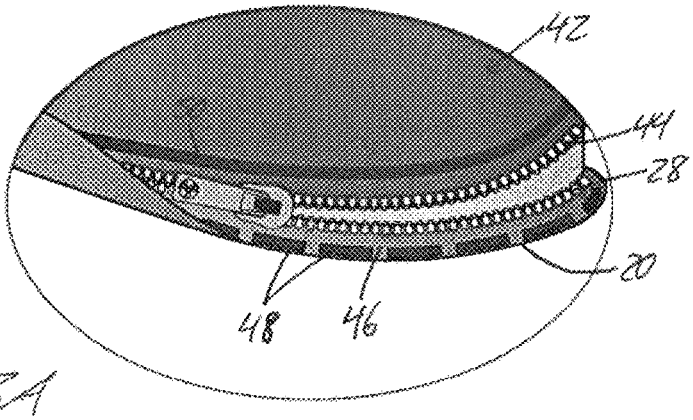
FIG. 3A shows a partial close-up view of the zippered connection.

The assembled foam body 38 defines the overall three-dimensional shape of the billboard embellishment, but does not define the finished appearance thereof. Instead, a separate flexible cover 42 formed of a suitably weather-proof fabric is shaped for conforming placement over the strapped-on three-dimensional foam body 38. With reference to FIG. 3, an open side of the cover 42 is equipped with a second set of zipper teeth 44 spanning fully around the perimeter thereof. This zipper-equipped open end of the cover 42 has a shape matching the zippered path on the footprint area 24 of the flexible banner. Accordingly, with the foam body strapped to the flexible banner, the open side of the flexible cover 42 is slipped over the foam body and pulled snug up to the zippered area of the flexible banner 12, thus pulling the remainder of the cover 42 into taut conformance over the front side and exposed peripheral edges of the three-dimensional foam body 38. Simple engagement of the zipper between the cover and the flexible banner, as shown in FIG. 3A, thus fully encloses the three-dimensional foam body 38 within an internal three-dimensional space delimited between the front side of the banner 12 and the zippered cover 42. The assembled and strapped-down foam body 38 imparts this internal space of the cover with the foam body's predetermined three-dimensional shape. The cover is selected from appropriately colored fabric, died to a particular color, or painted or printed with a particular color, design, pattern, image, or other finish to impart the desired appearance of the finished three-dimensional embellishment, whose outward appearance is defined by the exposed exterior surface of the fabric cover.

The cover serves to both define this final exterior aesthetic of the 3D embellishment, and to protect the concealed foam body 38 from exposure to the elements, thereby avoiding the need to specifically paint, coat or otherwise apply finishing layers directly to the foam blocks 32. In the meantime, the internal foam body 38 is confidently strapped to the reinforced banner 12 by the belts 30, whereby the convenient, visually unobtrusive zippered connection of the cover to the banner is not borne with the physical load of the foam body inside.

FIG. 3A illustrates how the zippered connection may be fully concealed from sight. At the outer outline 20 of the footprint area 24, a foldable concealment flap 46, for example in the form of an unsewn outer edge of the discrete footprint layer 24 defined separately of the banner itself, resides outside the first set of zipper teeth 28 at the front side of the banner, and features one or more pieces of hook or loop fabric 48 spanning fully around the flap on the front side thereof that opposes the banner 12. The exterior of the cover 42 features one or more pieces of mating hook or loop fabric 50 circumscribing the open side of the cover 42 a short distance inward from the cover's zipper teeth 44. Accordingly, once the cover has been zippered to the banner 12, the concealment flap 46 is folded up over the mating zipper teeth 26, 44 and fastened to the cover via the cooperating pieces of hook and loop fabric circumscribing the footprint area and cover.

Turning back to FIG. 1, the billboard support structure 100 is of conventional design, featuring a framework 102 that is mounted atop an upright column or post 104 and carries a plywood facing 106 or other substrate at the front side of the framework 102 from which the billboard is to visibly face outward. The banner 12 is installed over the facing 106, at least in part, by stretching the mesh/netting 26 taut over the support structure facing 106, for example by running top and bottom rods 27a, 27b horizontally through looped top and bottom ends 26a, 26b of the mesh's vertically oriented webbing straps, and then running sets of ratchet straps 29 between these rods at the backside of the support structure facing 106 to pull the mesh tight against the front side of the support structure facing 106.

Figure 6A:
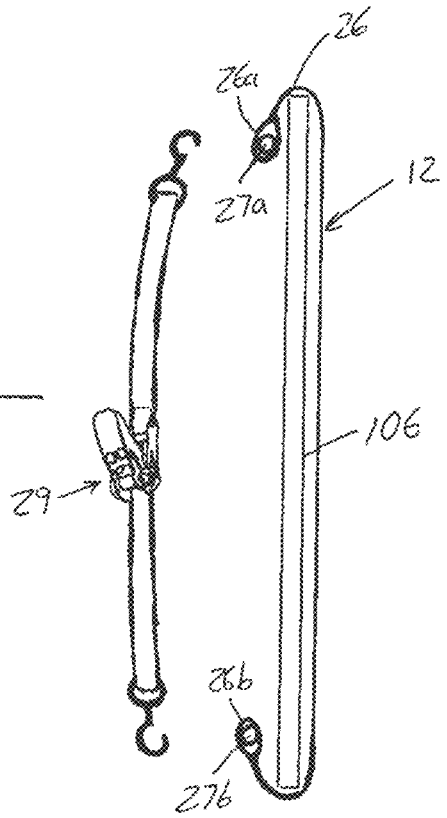
FIGS. 6A and 6B are side elevational views illustrating tensioning of the webbing reinforcement layer on a billboard support structure during installation of the webbing-reinforced vinyl banner.

This is schematically illustrated in FIG. 6A, where one of the vertical webbing straps is shown running vertically over the facing 106 of the support structure with its top and bottom ends wrapped over the top and bottom edges of the facing 106 to place the top and bottom loops 26a, 26b of the webbing strap behind the facing 106 of the support structure. An upper rod 27a is passed through the top loops 26a of the vertical straps of the mesh or netting 26, and a lower rod 27b is passed through the bottom loops 26b of the vertical straps. At select locations spaced along these rods, a ratchet strap 29 has its ends hooked or clipped onto the rods 27a, 27b so that tightening of the ratchet straps tensions the mesh taught across the facing 106 of the support structure.

Figure 6B:
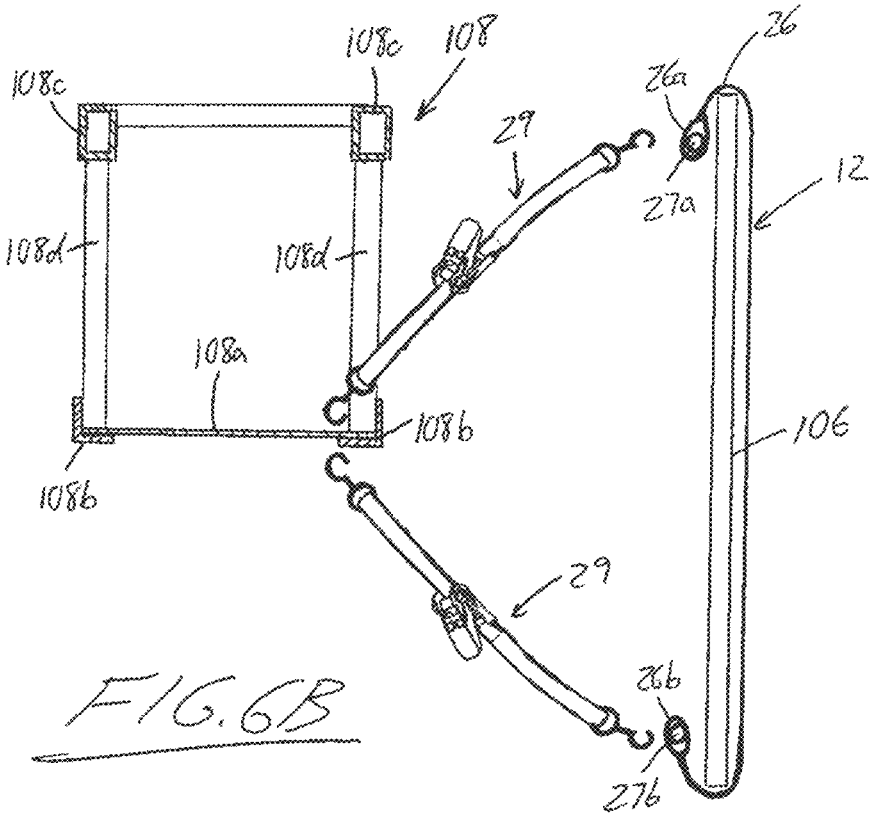

FIG. 6B shows similar tightening of the mesh/netting 26 using ratchet straps, but instead of being connected directly between the two rods 27a, 27b, each ratchet strap 29 is instead connected from one of the rods 27a, 27b to some part of the billboard support structure's framework 102. In the illustrated example, each ratchet strap is being connected to an upper rear catwalk 108 of the framework that is situated behind the facing 106. Here, each ratchet strap 29 may be hooked or clipped to the catwalk grating 108a, the catwalk beams 108b on which the grating is supported to form a platform, the catwalk handrails 108c mounted in spaced elevation over the platform, or the handrail stanchions 108d that stand upright from the beams 108b to support the handrail. Any other rigid component or assembly in the framework of the billboard support structure may alternatively be used as a similar anchor point to which the ratchet straps are connectable so that the tightening of the straps will tension the mesh/netting 26.

The mesh 26 may be provided only at the embellishment carrying area of the banner, since this is where the extra reinforcement of the banner is required to carry the added weight of the 3D embellishment, in which case the tensioning of the mesh may be combined with other conventional means for attaching and tensioning the banner over the facing of the billboard structure to complete the installation of the banner.

The banner may similarly be installed on panel-less billboard display structures that lack a facing panel of plywood or other material, for example as are commonly used in hurricane prone regions where the plywood panels can be ripped loose in extreme weather conditions and become dangerous airborne projectiles. Such panel-less billboard display structures instead simply have an open framework delimiting a rectangular area over which the banner is similarly stretch out and secured in the same manner outlined above. The mesh/netting of the banner of the present invention thus forms an integral structural support for the 3D embellishment, whereby the present invention enables installation of 3D billboards on panel-less billboard structures that could not previously support conventional reinforced foam embellishments due to the absence of structural panels to which reinforced foam embellishment could be fastened.

Once the banner 12 has been installed in the above described manner, then the above described steps of installing the embellishment can be performed, for example, by on-site assembly of the foam blocks 32 to create the overall three-dimensional body 38, placement of the assembled three-dimensional body 38 against the discretely identifiable footprint area of the banner, strapping of the three-dimensional body 38 to the banner using belts 30, slipping of the cover 42 over the strapped-on three-dimensional body 38, zippered fastening of the cover 42 to the banner 12, and folding of the optional concealment flaps 46 over the zippered connection, all of which can be performed at ground level to fully complete the billboard assembly prior to lifting thereof up to the support framework at the top of the billboard support structure. Accordingly, the final installation step performed at the elevated framework of the billboard support structure is a simple one-step installation process of stretching and securing the flexible banner over the paneled or non-paneled display area of the framework. As an alternative, it is also possible to first install the banner, and then separately crane-hoist or otherwise lift the assembled three-dimensional foam body up to the installed banner, and then place and strap three-dimensional body thereon. However, pre-assembling the billboard at ground level is typically preferable from both an efficiency and safety standpoint.

Other than the banner itself, no component of the three-dimensional embellishment requires any fastening to the billboard support structure, and the hook and loop fastening of the belts and the zippered attachment of the cover can all be performed easily in a tool-free manner by an installer of any skill level.

The foam blocks 32, defining the inserts that impart the intended three-dimensional shape to the embellishment 18 once concealed within the external cover 42, are kept to minimal weight and ease of placement by omitting internal reinforcements, and are produced quickly and cost effectively without need for painting or other protective coatings. The illustrated embodiment uses multiple foam insert blocks 32 to assemble to the finished three-dimensional insert body 38, whereby the multiple blocks can be shipped more space and cost efficiently than a singular pre-fabricated body, particularly in the illustrated embodiment where the flat faced front of the embellishment means the blocks can be stacked atop one another in a balanced manner. However, it will be appreciated that other embodiments may use a singular foam body requiring no on-site assembly, while still benefiting from other advantageous aspects of the invention.

While the illustrated embodiment uses a gridded mesh or netting of reinforcement strapping at the rear side of the banner, other embodiments may use the rear-side reinforcement technique disclosed in Applicant's prior patent, referenced and incorporated herein in the background section above, where individual straps of webbing (as opposed to a meshwork or netting of interconnected strap) are instead attached to the rear side of the banner only behind the footprint area at which the embellishment will be installed.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A three-dimensional billboard display system comprising:

a flexible sheet of banner material having displayed advertisement, promotional or informational content on a display side of said flexible sheet;

a two-dimensional footprint area on the display side of said flexible sheet that is discretely identifiable from the displayed content;

a flexible cover fastened, or selectively fastenable, to the flexible sheet in a position overlying the two-dimensional footprint area on the display side of said flexible sheet to enclose a three-dimensional space between said cover and said flexible sheet; and one or more inserts forming, or positionable with one another to form, a three-dimensional body of predetermined shape that resides, or is placeable at, the display side of the flexible sheet in an installed position overlying the two-dimensional footprint area to accept taut placement of the flexible cover over the three-dimensional body to impart the [three-dimensional] *predetermined* shape to said three-dimensional space and thereby provide the flexible cover with a three-dimensional form bulging outwardly from the display side of the flexible sheet to create a three-dimensional embellishment on said flexible sheet of banner material;

wherein said one or more inserts comprise a first set of fastening elements thereon by which said one or more inserts are fastened, or fastenable, to the flexible sheet.

2. The system of claim 1 wherein said flexible banner comprises a second set of fastening elements thereon cooperably engaged, or engageable, with the first *set* of fastening elements to secure the one or more inserts to the flexible sheet.

3. The system of claim 2 wherein the first and second sets of fastening elements comprises hook and loop fastening elements.

4. The system of claim 3 wherein said hook and loop fastening elements comprise flexible belts with mounting portions attached to a first one of either said flexible sheet or said one or more inserts and free portions movable relative to said mounting portions, and mating pieces attached to a second of either said flexible sheet or said one or more inserts for receiving said free portions of the flexible belts to hold said one or more inserts to the flexible sheet.

5. The system of claim 4 wherein the flexible belts are fastened through the flexible sheet to reinforcement members on a backside of the flexible sheet.

6. The system of claim 4 wherein the flexible belts are attached to the flexible sheet, and the mating pieces are attached to said one or more inserts.

7. The system of claim 6 wherein the flexible belts span across the two-dimensional footprint area, with the mounting portions residing within said [mounting area] *two-dimensional footprint area* and the free portions reaching beyond said footprint area at opposing sides thereof.

8. The system of claim 7 wherein the mating pieces circumscribe multiple sides of the one or more inserts for mating of the flexible belts with said mating pieces in a manner wrapped around said multiple sides of the one or more inserts.

9. [The system of claim 1 wherein] *A three-dimensional billboard display system comprising:*

*a flexible sheet of banner material having a display side for displaying advertisement, promotional or informational content, and a rear side that opposes said display side;*

*a two-dimensional footprint area on the display side of said flexible sheet that is discretely identifiable from the displayed content;*

*a three-dimensional body of predetermined shape that resides, or is placeable at, the display side of the flexible sheet in an installed position overlying the two-dimensional footprint area to impart a three-dimensional shape thereto and thereby provide a three-dimensional form bulging outwardly from the display side of the flexible sheet to create a three-dimensional embellishment on said flexible sheet of banner material; and*

*a first set of fastening elements attached to the three dimensional body and by which said three-dimensional body is fastened to the flexible sheet;* the flexible sheet has rear side that opposes the display side thereof, [and] a reinforcement layer is attached to the rear side of the flexible sheet and comprises flexible reinforcement members that are foldable together with the flexible banner*, and said reinforcement layer provides reinforcement strength to the flexible sheet in order to enable support of the three-dimensional embellishment, as fastened thereto, in a cantilevered state jutting from the display side of the flexible sheet when the flexible sheet is installed on a billboard support structure*.

10. The system of claim 9 wherein the flexible reinforcement members are arranged in criss-crossing fashion to form a mesh or netting.

11. The system of claim 9 wherein said flexible reinforcement members have a greater tear strength than said flexible sheet of banner material.

12. The system of claim 9 wherein said flexible reinforcement members comprise webbing.

13. The system of claim 9 wherein the flexible reinforcement members include a set of flexible reinforcement members running along a height dimension of the banner so as to lie in upright orientations in an installed state of the billboard display system, said set of flexible reinforcement members carrying installation loops at opposing top and bottom ends thereof to receive passage of mounting rods through said loops at top and bottom sides of reinforcement layer to enable tensioning of the flexible banner on a billboard support structure behind a display area thereof by use of ratchet straps connected to said mounting rods.

14. The system of claim 1 wherein the one or more inserts reside in the installed position at the display side of the flexible sheet, occupy the [predetermined shape] *three-dimensional space* and are tautly covered by the flexible cover.

15. A three-dimensional billboard display system comprising:

a flexible sheet of banner material having displayed advertisement, promotional or informational content on a display side of said flexible sheet;

a two-dimensional footprint area on the display side of said flexible sheet that is discretely identifiable from the displayed content;

a flexible cover fastened, or selectively fastenable, to the flexible sheet in a position overlying the two-dimensional footprint area on the display side of said flexible sheet to enclose a three-dimensional space between said cover and said flexible sheet; and one or more inserts forming, or positionable with one another to form, a three-dimensional body of predetermined shape that resides, or is placeable at, the display side of the flexible sheet in an installed position overlying the two-dimensional footprint area to accept taut placement of the flexible cover over the three-dimensional body to impart the [three-dimensional] *predetermined* shape to said three-dimensional space and thereby provide the flexible cover with a three-dimensional form bulging outwardly from the display side of the flexible sheet to create a three-dimensional embellishment on said flexible sheet of banner material;

wherein the flexible sheet and the flexible cover comprise mating zipper teeth co-operating, or co-operable, with one another to achieve zippered fastening of the flexible cover to the flexible sheet along a perimeter of the two-dimensional footprint area.

16. A three-dimensional billboard display system comprising:

a flexible sheet of banner material having displayed advertisement, promotional or informational content on a display side of said flexible sheet;

a two-dimensional footprint area on the display side of said flexible sheet that is discretely identifiable from the displayed content;

a flexible cover fastened, or selectively fastenable, to the flexible sheet in a position overlying the two-dimensional footprint area on the display side of said flexible sheet to enclose a three-dimensional space between said cover and said flexible sheet; and one or more inserts forming, or positionable with one another to form, a three-dimensional body of predetermined shape that resides, or is placeable at, the display side of the flexible sheet in an installed position overlying the two-dimensional footprint area to accept taut placement of the flexible cover over the three-dimensional body to impart the [three-dimensional] *predetermined* shape to said three-dimensional space and thereby provide the flexible cover with a three-dimensional form bulging outwardly from the display side of the flexible sheet to create a three-dimensional embellishment on said flexible sheet of banner material;

wherein the one or more inserts comprise a plurality of inserts connected, or selectively connectable, to one another to form the three-dimensional body, and separable to one another for transport and storage.

17. The system of claim 16 wherein the plurality of inserts comprise paired inserts having mated, or matable, male and female features thereon.

18. The system of claim 17 wherein the male and female features define respective halves of a dovetail joint.

19. A method of creating a three-dimensional billboard display, the method comprising placing one or more inserts over a two-dimensional footprint area at a display side of a flexible banner such that the one or more inserts project forwardly from the display side of the banner with a predetermined three-dimensional shape, and securing a flexible cover to the flexible banner along a perimeter of the two-dimensional footprint area thereof in a position spanning over the one or inserts in a taut condition imparting said three-dimensional shape to said flexible cover, wherein the method is further characterized by inclusion of one or more of the following steps:

(a) prior to securing the flexible cover to the flexible banner, assembling a plurality of said inserts to one another to form the predetermined three-dimensional shape;

(b) prior to securing the flexible cover to the flexible banner, fastening the one or more inserts to the banner independently of the flexible cover; and (c) when securing the flexible cover to the flexible banner, securing the flexible cover to the flexible banner by zippered connection thereto.

20. The method of claim 19 comprising step (a).

21. The method of claim 19 comprising step (b).

22. The method of claim 19 comprising step (c).

*23. The system of claim 9 wherein the reinforcement layer spans at least the two-dimensional footprint area that is overlain by the installed position of the three-dimensional embellishment.*

*24. The system of claim 23 wherein the reinforcement layer spans less than an entirety of the flexible sheet.*

*25. The system of claim 9 comprising a second set fastening elements attached to the flexible sheet of banner material that are co-operably engaged with the first of one or more fastening elements fasten the three-dimensional body to the flexible sheet.*

* * * * *